United States Patent
Donners et al.

(10) Patent No.: US 8,134,311 B2
(45) Date of Patent: Mar. 13, 2012

(54) LIGHT SOURCE AND METHOD FOR OPERATING A LIGHTING SYSTEM

(75) Inventors: Maurice Alexander Hugo Donners, Eindhoven (NL); Cornelis Jojakim Jalink, Eindhoven (NL); Gerardus Arnoldus Rita Van Dijk, Eindhoven (NL); Vincent Fischer, Eindhoven (NL); Hans Van Sprang, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 442 days.

(21) Appl. No.: 12/518,643
(22) PCT Filed: Dec. 12, 2007
(86) PCT No.: PCT/IB2007/055055
§ 371 (c)(1), (2), (4) Date: Jun. 11, 2009
(87) PCT Pub. No.: WO2008/075260
PCT Pub. Date: Jun. 26, 2008

(65) Prior Publication Data
US 2010/0102759 A1 Apr. 29, 2010

(30) Foreign Application Priority Data
Dec. 18, 2006 (EP) .................. 06126304

(51) Int. Cl.
*H05B 37/00* (2006.01)
(52) U.S. Cl. ........... 315/326; 315/56; 315/246; 313/639
(58) Field of Classification Search .............. 315/56, 315/58, 63, 64, 72, 73, 74, 76, 327, 330, 315/363, 312, 246, DIG. 5; 313/639, 484, 313/487, 486, 485
See application file for complete search history.

(56) References Cited

U.S. PATENT DOCUMENTS 4,176,299 A * 11/1979 Thornton, Jr. ................ 315/326
6,016,031 A * 1/2000 Lapatovich et al. .......... 313/493

FOREIGN PATENT DOCUMENTS

| DE | 10057881 A1 | 5/2002 |
| WO | 2005071712 A2 | 8/2005 |
| WO | 2005100508 A1 | 10/2005 |

OTHER PUBLICATIONS

Patil et al., "Synthesis and properties of Eu<2+> activated blue phosphors", Journal of alloys and compounds, Feb. 15, 1997, pp. 7-12, vol. 248.
CIE Publication, Method of measuring and specifying color rendering properties of light sources, 1995, No. 13.3.
Wiltschko et al., Red light disrupts magnetic orientation of migratory birds, Nature, Aug. 5, 1993, pp. 525-527.

* cited by examiner

Primary Examiner — David Hung Vu (57) ABSTRACT

The invention relates to a light source for generating light having a spectral emittance in at least a part of the range of 380 nm to 780 nm, the light having a spectral power distribution $E(\lambda)$ as a function of the wavelength $\lambda$, and a general color-rendering index Ra, wherein the ratio of the integral spectral power distribution over a first range of 575 nm$\leq\lambda\leq$650 nm to that of a second range of 380 nm$\leq\lambda\leq$780 nm is given by the relation: and wherein $B_b$, $\leq$0.15 and Ra$\geq$20. The light generated by the light source has a relatively small disturbing effect on migrating birds, while it still allows acceptable visibility for human beings.

13 Claims, 7 Drawing Sheets

LIGHT SOURCE AND METHOD FOR OPERATING A LIGHTING SYSTEM

FIELD OF THE INVENTION

The invention relates to a light source and a method for operating a lighting system.

BACKGROUND OF THE INVENTION

Nocturnally migrating birds may become disoriented on land and above the sea by artificial lights used for lighting, for example, offshore installations, skyscrapers, or lighthouses. Studies have shown that the degree of disorientation is dependent on the color of the light. In their article "Red light disrupts magnetic orientation of migratory birds" in *Nature* 364, 525-527 (5 Aug. 1993), Wolfgang Wiltschko, Ursula Munro, Hugh Ford and Roswitha Wiltschko report that red light generally causes disorientation of migrating birds by impairing magnetoreception, whereas the orientation of migrating birds are unaffected in the seasonally appropriate migratory direction in blue light, while green light causes no or only minor disturbance of orientation. However, pure blue or pure green light is not optimal for human vision comfort, and even not acceptable under conditions where safety is concerned, for example, on offshore installations. Furthermore, many (work) environments require at least a limited ability to recognize the color red so as to enable people to recognize safety equipment and signs that are typically red, for example, fire extinguishers or emergency buttons.

OBJECT AND SUMMARY OF THE INVENTION

It is an object of the invention to provide a light source that has both a relatively small disturbing effect on migrating birds and allows relatively good visibility for human beings.

According to the invention, the object is achieved with a light source for generating light having a spectral emittance in at least a part of the range of 380 nm to 780 nm, the light having a spectral power distribution $E(\lambda)$ as a function of the wavelength $\lambda$, and a general color-rendering index $R_a$, wherein the ratio of the integral spectral power distribution over a first range of 575 nm$\leq\lambda\leq$650 nm to that of a second range of 380 nm$\leq\lambda\leq$780 nm is given by the relation:

$$\frac{\int_{575}^{650} E(\lambda)d\lambda}{\int_{380}^{780} E(\lambda)d\lambda} = B_b,$$

and wherein $0<B_b\leq 0.15$ and $R_a\geq 20$.

The inventors have found that a light source has a relatively small disturbing effect on nocturnally migrating birds when it generates light having a ratio of less than or equal to 0.15 of the integrated spectral power distribution over a first range of 575 nm$\leq\lambda\leq$650 nm to that of a second range of 380 nm$\leq\lambda\leq$780 nm. The disturbing effect is approximately equal to or less than the effect of a light source generating substantially green light, which is generally considered as an acceptable level of disturbance on migrating birds. Moreover, the generated light allows an acceptable visibility for human beings. When used on, for example, offshore installations, the light source according to the invention makes it possible for human beings to distinguish red objects, while the generated light has a relatively small disturbing effect on migrating birds.

A preferred embodiment of the light source according to the invention is characterized in that $B_b\leq 0.10$, preferably $\leq 0.05$, which results in a further reduction of the disturbing effect on nocturnally migrating birds.

A preferred embodiment of the light source according to the invention is characterized in that the light source is a low-pressure mercury vapor discharge lamp comprising a discharge vessel, the discharge vessel enclosing, in a gastight manner, a discharge space provided with an inert gas and mercury and comprising discharge means for maintaining a discharge in the discharge space, at least a part of a wall of the discharge vessel being provided with a luminescent layer comprising a mixture of $BaMg_2Al_{16}O_{27}$:Eu, Mn and $BaMgAl_{10}O_{17}$:Eu. The ratio of the amount by weight of $BaMg_2Al_{16}O_{27}$:Eu, Mn divided by the amount by weight of $BaMgAl_{10}O_{17}$:Eu is preferably in the range of 1.5 to 13, more preferably in the range of 1.5 to 2. More preferably, this ratio is in the range of 1.8 to 1.9. Such a fluorescent lamp is a relatively efficient light source which can be used for lighting, for example, offshore installations or buildings near the sea.

A preferred embodiment of the light source according to the invention is characterized in that the light source comprises a plurality of green LEDs and blue LEDs. The light source preferably further comprises at least one red LED. This has the advantage that it is relatively easy to change the spectral composition of the generated light by dimming or boosting LEDs of a specific color.

A preferred embodiment of the light source according to the invention is characterized in that the light source is a high-pressure metal halide discharge lamp comprising a discharge vessel, the discharge vessel enclosing, in a gastight manner, a discharge space provided with an inert gas, mercury and a metal halide and comprising discharge means for maintaining a discharge in the discharge space. The metal halide preferably comprises a mixture of thallium iodide and indium iodide, wherein the ratio of the amount by weight of thallium iodide to the amount by weight of indium iodide is preferably in the range of 1.3 to 1.7, for example 1.5. More preferably, the discharge space is provided with mercury in such an amount that the ratio of the amount by weight of mercury to the combined amount by weight of thallium iodide and indium iodide is preferably in the range of 9 to 11, for example 10. A high-pressure metal halide lamp has a relatively high output power and the emission spectrum of the lamp can be changed relatively easily by varying the metal halide or mixture of metal halides used as a filling.

A preferred embodiment of the light source according to the invention is characterized in that the light source further comprises an interference filter which at least partly reflects or absorbs light having a wavelength $\lambda$ in the range of 575 nm$\leq\lambda\leq$650 nm so as to prevent the light in said range from reaching the surroundings of the light source. The light source is preferably a high-pressure metal halide lamp having a discharge vessel, the discharge vessel enclosing, in a gastight manner, a discharge space provided with an inert gas, mercury and a metal halide and comprising discharge means for maintaining a discharge in the discharge space, and an interference filter of alternating layers with a low index of refraction, for example layers comprising $SiO_2$, and layers with a high index of refelaction, for example layers comprising $TiO_2$, provided on at least a part of the discharge vessel. Such a light source allows use of a conventional lamp for obtaining the desired spectral composition of the light.

The invention further relates to a method for operating a lighting system. The lighting system comprises at least one light source of the invention which either further comprises at least one additional lighting element or is combined with at least one separate additional lighting element. Said additional lighting element and said light source can be mutually independently controlled, for example dimmed, boosted or switched off/on. When in the on-state the at least one lighting element is used in combination with the light source, the additional lighting element has the specific feature of emitting predominantly, i.e. for at least 60%, of its visible spectral power distribution in the wavelength range of 575 nm to 780 nm (red spectrum). When the additional lighting element is used solely, it has an emission spectrum with CIE color coordinates close to or on the black body locus, i.e. its emission spectrum appears white or whitish. Such a lighting system enables the user to select the spectrum emitted by the system in dependency of the actual circumstances. In particular it is desired for the user to have a spectrum similar to daylight ("daylight state") during the periods outside the bird migrating season. Then both the at least one light source and the at least one additional lighting element are in the "on"-state or alternatively only the at least one additional lighting element having a daylight spectrum is in the on-state. Only during the bird migration season the system is possibly set to the "moonlight state", i.e. the state in which the system has an emission spectrum as specified in claim 1, and only the at least one light source is in the "on-state" and the at least one additional lighting element is in the "off-state". For offering good comfort to the human users, the lighting system should be used as much as possible in the daylight state. So, in dependency on the bird migrating seasons and at the varying height birds migrate during said seasons, the lighting system may be used in the daylight state during the bird migration season when the birds are migrating at relatively high altitudes, as then the birds will not observe and hence will not be disturbed by the light. The lighting system must be used in the moonlight state during the bird migrating season when the birds migrate at relatively low altitude.

Various embodiments of said lighting system are envisaged. Some, non-limiting, examples will be given:

Example 1

A lighting system comprising three 36 W low-pressure mercury gas discharge lamps (TLD) in a single housing, two TLD's are according to the light source of the invention and are capable of emitting a moonlight spectrum and one TLD is capable of emitting a daylight-like spectrum, for example a TLD/84 having a spectrum with an apparent color temperature of about 3400K. With only the additional lighting element in the on-state, i.e. the TLD emitting a spectrum giving a daylight impression, the system has a color rendering $R_a$ of about 82, a color rendering for red $R_9$ of about 83 and the parameter $B_b$ is >0.15. Thus a very good spectrum for human comfort and safety is provided. With only the light source in the on-state, i.e. the two TLD emitting the moonlight spectrum in the on-state, the color rendering is about 33 and the parameter $B_b$ is about 0.05.

Example 2

A lighting system comprising one TLD's 36 W emitting a moonlight spectrum and a separate additional lighting element comprising a unit of ten 1 W Luxeon I red LEDs with a peak wavelength of 644 nm. With all parts of the lighting system in the on-state, the lighting system then being in the daylight-state, the system has a color rendering $R_a$ of about 64 and a $R_9$ of about 69, thus providing a satisfactory comfort level and safety level to humans.

Example 3

A simple lighting system comprising eighteen blue, thirty-six green and three red 1 W Luxeon LEDs, said lighting system only being switchable between the off-state, the daylight state and the moonlight state. With only the blue and the green LEDs in the on-state, the system has color rendering of about 21 and parameter $B_b$ is about 0.4%. Upon switching the red LEDs to the on-state, the system has a color rendering $R_a$ of about 64 and the color rendering for red $R_9$ is about 84. Alternatively phosphor coated LEDs with appropriate phosphors for red emission may be added. Optionally ten 1 W Luxeon I amber LEDs may be added to the system which upon doing so increases the color rendering $R_a$ to about 80 and the red color rendering $R_9$ to 74.

BRIEF DESCRIPTION OF THE DRAWINGS

These and other aspects of the invention are apparent from and will be elucidated with reference to the embodiments described hereinafter.

In the drawings.

DESCRIPTION OF EMBODIMENTS

Figure 1A:
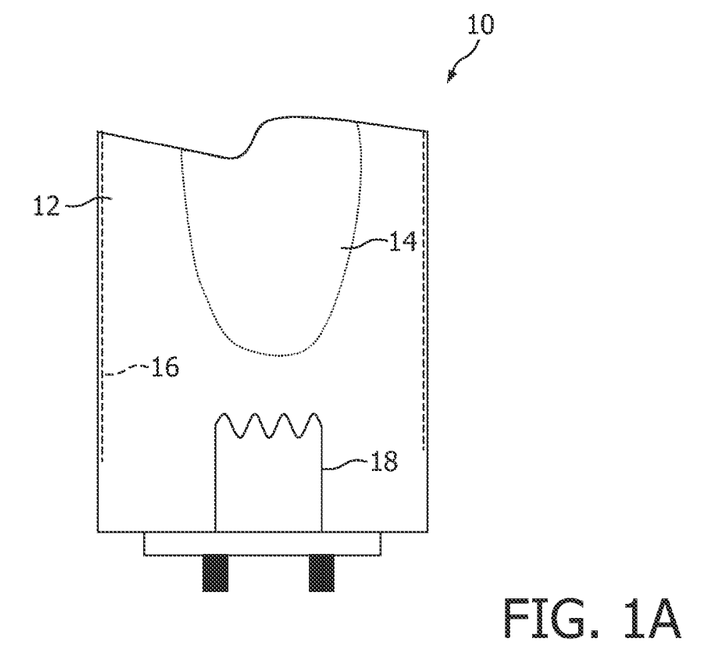
FIGS. 1A and 1B are cross-sectional views of a first and a second embodiment of a light source according to the invention.
Figure 1B:
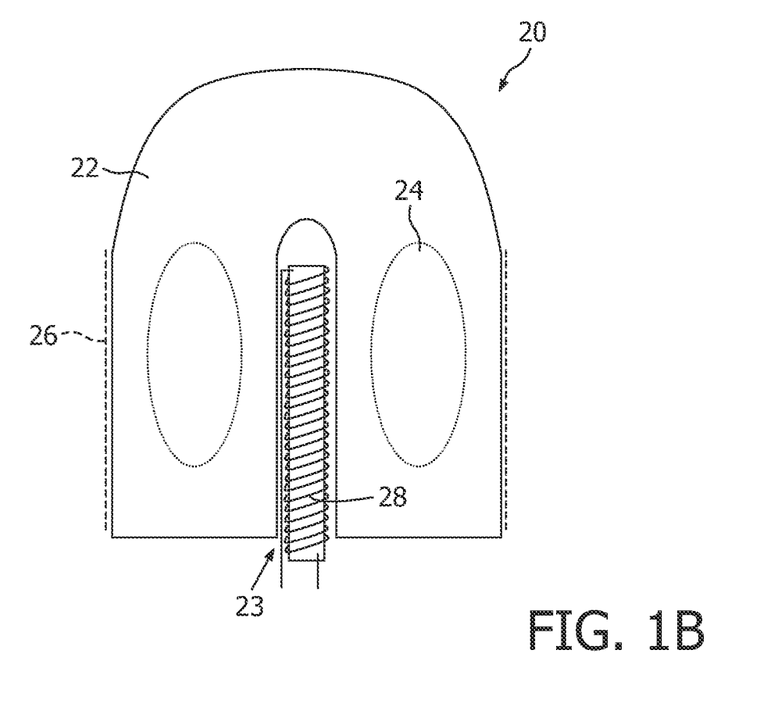

FIGS. 1A and 1B are schematic cross-sectional views of a first and a second embodiment of a light source 10, 20 according to the invention. FIG. 1A only shows one end portion of the light source 10; actually, the light source 10 comprises two mutually opposite, identical end portions, each sealing one end of an elongated discharge vessel 12. The light sources 10, 20 are low-pressure gas discharge lamps comprising a light-transmitting discharge vessel 12, 22 which encloses a discharge space 14, 24 in a gastight manner. The discharge space 14, 24 comprises a gas filling of mercury and a buffer gas, for example, argon or xenon. The low-pressure gas discharge lamp 10, 20 further comprises discharge means 18, 28 for maintaining a discharge in the discharge space 14, 24. The discharge means 18, 28 couple energy into the discharge space 14, 24, for example, via capacitive coupling, inductive coupling, microwave coupling, or via electrodes.

In the embodiment of the gas discharge lamp 10 shown in FIG. 1A, the discharge means 18 comprise a set of electrodes 18. In FIG. 1A, only one electrode 18 of the set of electrodes 18 is shown. The electrodes 18 are electrically connected through the discharge vessel 12 of the low-pressure gas discharge lamp 10. By applying an electric potential difference between the two electrodes 18, a discharge is initiated between them. This discharge is generally located between the two electrodes 18 and is indicated in FIG. 1A as the discharge space 14.

In the embodiment of the low-pressure gas discharge lamp 20 shown in FIG. 1B, the discharge means 28 comprise an inductive coupler 28 for inductively maintaining the discharge in the low-pressure gas discharge lamp 20. Alternatively, the inductive coupler 28 may also be used for generating the discharge. The inductive coupler 28, also referred to as power coupler 28, generally comprises a coil wound on a ferrite core of, for example, nickel-zinc ferrite or manganese-zinc ferrite. The inductive coupler 28 is arranged in a protrusion 23 in the discharge vessel 22 and generates a varying electromagnetic field inside the discharge vessel 22 at the discharge space 24. Inductively generating and/or maintaining the discharge in the low-pressure gas discharge lamp 20 has the advantage that the electrodes 18, which generally limit the lifetime of the low-pressure gas discharge lamp, can be dispensed with. Alternatively, the inductive coupler 28 may be arranged outside (not shown in FIG. 1B) the discharge vessel 22, resulting in a simplification of the manufacturing process for the discharge vessel 22.

Figure 2:
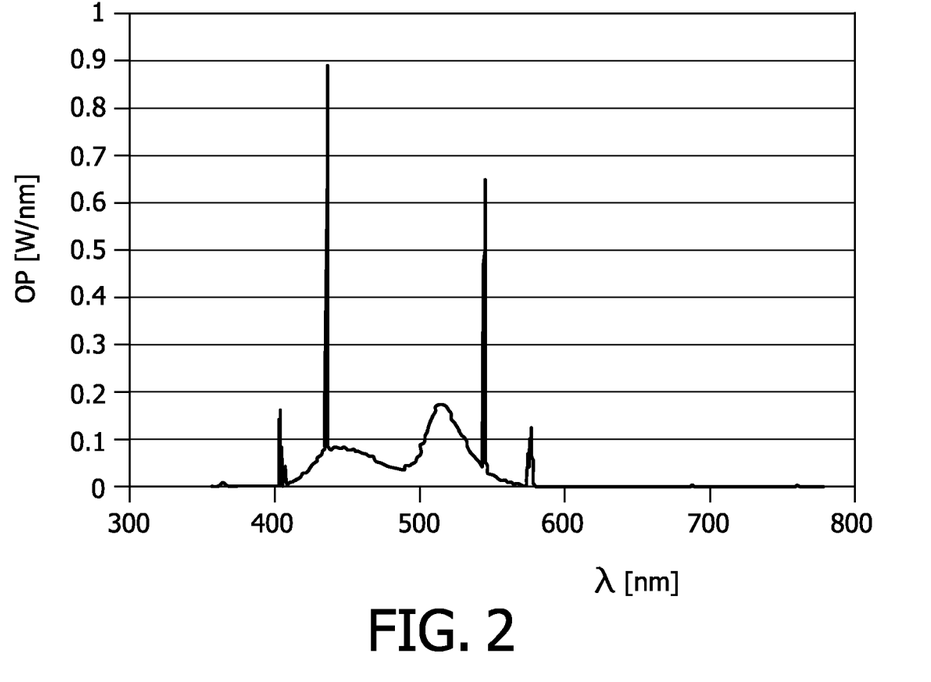
FIG. 2 shows a spectral power distribution of the first and the second embodiment of a light source according to the invention.

Referring to FIGS. 1A and 1B again, electrons and ions in the gas filling of the discharge space 14, 24 are accelerated by the electromagnetic field and collide with the mercury compound in the gas filling. Due to the collision, the mercury atoms are excited and subsequently emit light, mainly ultraviolet light at a wavelength of approximately 254 nm. The low-pressure gas discharge lamp 10, 20 comprises a luminescent layer 16, 26 of a luminescent material which absorbs and subsequently converts the absorbed ultraviolet light into visible light. The luminescent material is a combination of europium-activated barium magnesium aluminate, $BaMgAl_{10}O_{17}:Eu^{2+}$ (also referred to as BAM), which emits substantially blue light, and europium, and manganese-activated barium magnesium aluminate, $BaMg_2Al_{16}O_{27}:Eu^{2+}$, $Mn^{4+}$ (also referred to as BAM green). The ratio of the amount by weight of BAM green divided by the amount by weight of BAM is in the range of 1.5 to 13, preferably in the range of 1.5 to 2 and more preferably in the range of 1.8 to 1.9. In this embodiment of the low-pressure gas discharge lamp 10, 20, the ratio of the amount by weight of BAM green divided by the amount by weight of BAM is 1.9. FIG. 2 shows the resulting spectral power distribution, i.e. the output power OP in W nm$^{-1}$ versus the wavelength λ in nm of the generated light, of the low-pressure gas discharge lamp 10, 20. The general color-rendering index $R_a$ of the generated light is 33, and the correlated color temperature is 29857 K. The color coordinates are x=0.1676 and y=0.3207. The parameter $B_b$, the ratio of the integral spectral power distribution over a first range of 575 nm≦λ≦650 nm to that of a second range of 380 nm≦λ≦780 nm, is 0.029. In an alternative embodiment, the ratio of the amount by weight of BAM green divided by the amount by weight of BAM is 13, resulting in light having a general color-rendering index $R_a$ of 21 and a parameter $B_b$ of 0.05. The general color-rendering index $R_a$ and the parameter B of the low-pressure gas discharge lamp 10, 20 are determined by the light emitted from the discharge space 14, 24 that is not converted by the luminescent layer 16, 26 mixed with the light emitted as a result of conversion by the luminescent layer 16, 26. By choosing a specific luminescent material or a mixture of luminescent materials, light with an appropriate value of the general color-rendering index $R_a$ and the parameter $B_b$ is generated.

Figure 3:
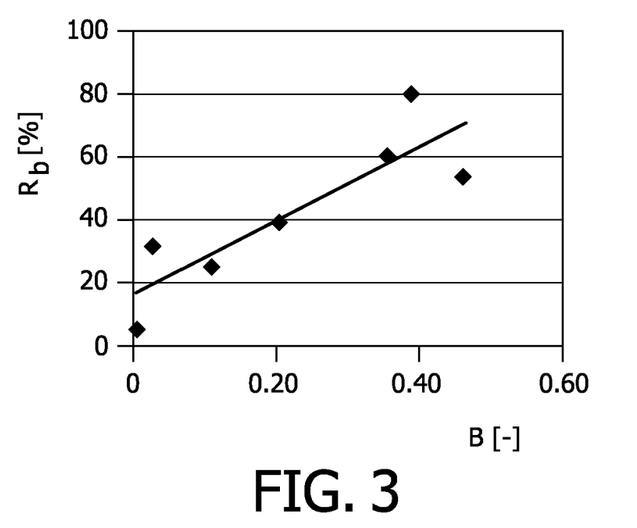
FIG. 3 shows the relation between the parameter $B_b$ and the reaction percentage $R_b$.

FIG. 3 shows the relation between the parameter B and the reaction percentage $R_b$. Parameter $B_b$ is defined as the ratio of the integral spectral power distribution over a first range of 575 nm≦λ≦650 nm to that of a second range of 380 nm≦λ≦780 nm:

$$\frac{\int_{575}^{650} E(\lambda)d\lambda}{\int_{380}^{780} E(\lambda)d\lambda} = B_b,$$

wherein E(λ) is the spectral power distribution [W nm$^{-1}$] as a function of the wavelength λ [nm]. The reaction percentage $R_b$ is defined as the number of birds that react to the light, i.e. deflect from the seasonally appropriate migratory direction, generated by a light source when passing this light source relative to the total number of birds that pass this light source. A total number of seven light sources with different emission spectra was tested, denoted by the symbols in FIG. 3. The reaction percentage $R_b$ increases with an increasing value of the parameter $B_b$ of the light generated by the light source. The straight line shows the relation between the parameter $B_b$ and the reaction percentage $R_b$ when using linear regression [regression coefficient=0.8]. It is concluded from FIG. 3 that in order to have a disturbing effect on migrating birds substantially equal to or less than that caused by pure green light [R=25%], the parameter $B_b$ of the emission spectrum must have a value equal to or lower than 0.15. The reaction percentage $R_b$ of pure green light is generally considered as an acceptable level of disturbance for migrating birds.

The general color-rendering index $R_a$ of the light generated by the light source according to the invention must have a value of at least 20 so as to have a sufficiently high color rendering, enabling a human being to recognize, for example, a red object. The general color-rendering index $R_a$ is based on the average of the color rendering of the first eight colors from a set of fourteen reference colors, as described in "CIE Publication No. 13.3, 1995, Method of Measuring and Specifying Color Rendering Properties of Light Sources" (ISBN 3 900 734 57 7).

Figure 4:
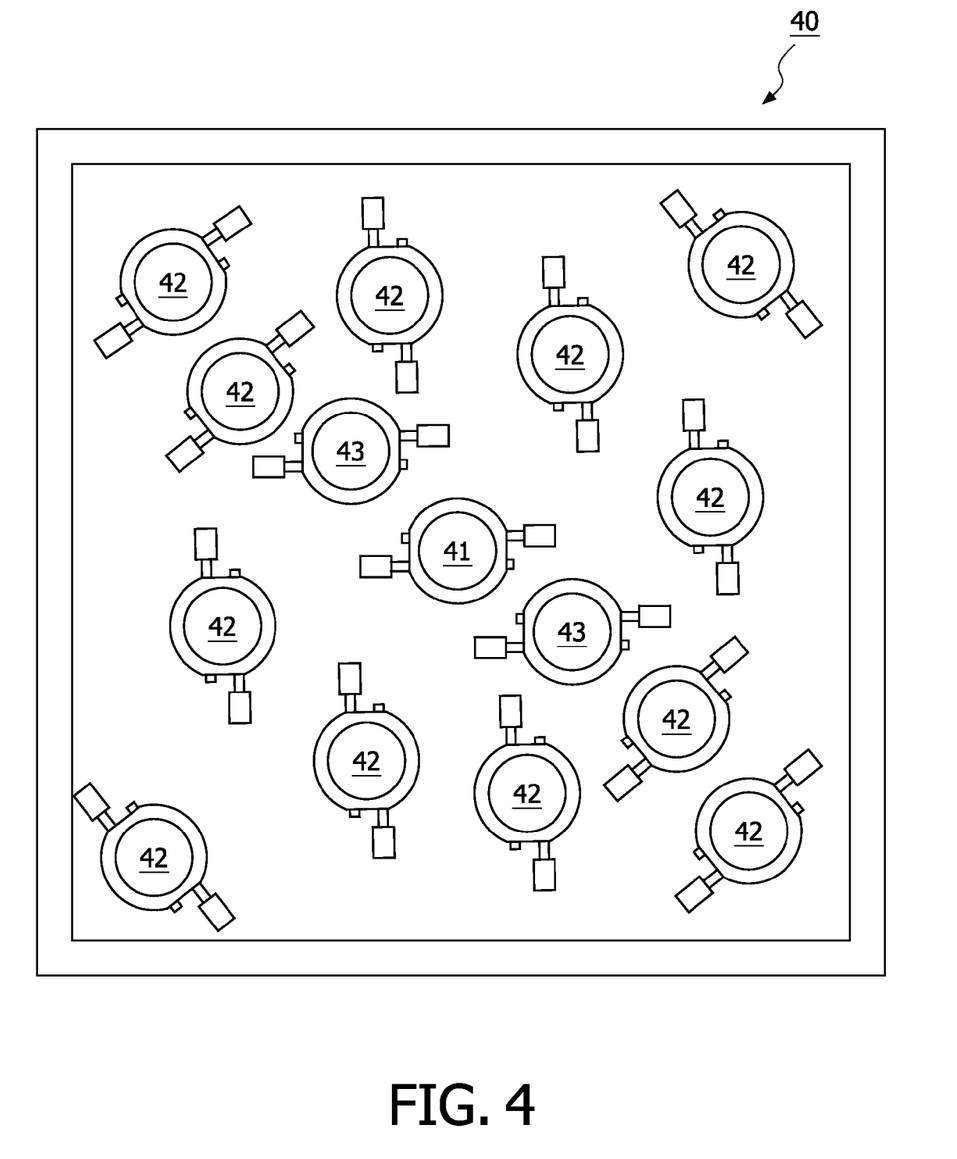
FIG. 4 is a cross-sectional view of a third embodiment of a light source according to the invention.
Figure 5A:
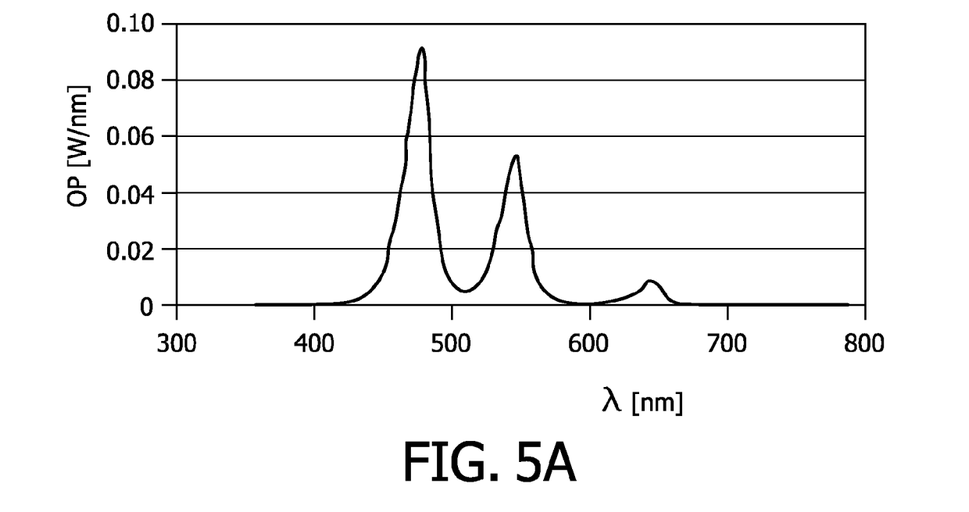
FIG. 5A shows a spectral power distribution of the third embodiment of a light source according to the invention.

FIG. 4 schematically shows a third embodiment of a light source 40 according to the invention. The light source comprises one red light-emitting diode (LED) 41, a plurality of twelve green LEDs 42 and a plurality of two blue LEDs 43. In this embodiment, all LEDs are Luxeon™ I LEDs from Philips Lumileds Lighting Company™. In an alternative embodiment, different LEDs can be used. The LED 41, the plurality of LEDs 42 and the plurality of LEDs 43 can preferably be dimmed in order to adjust the light output of the respective LEDs. The light source 40 has a light-transmissive exit window (not shown) facing the side of the LED emitting the light, and a rear side (not shown) facing away from the side of the LED emitting the light. The rear side preferably has a specular surface on the side facing the exit window. The light generated by the LEDs 41, 42, 43 is homogeneously mixed inside the light source 40 and emitted via the exit window. The red LED 41 is dimmed to a power usage of 60%, i.e. the percentage of the nominal power as specified, and the blue LEDs 43 are dimmed to a power usage of 64%. The green LEDs 42 are not dimmed, i.e. the power usage is 100%. The light source 40 emits light with a specific luminous flux of 316 lm. The emitted light has a color temperature $T_c$ of 7250 K, the color-rendering index $R_a$ is 40 and the parameter $B_b$, the ratio of the integral spectral power distribution over a first range of 575 nm$\leq\lambda\leq$650 nm to that of a second range of 380 nm$\leq\lambda\leq$780 nm, is 0.15. In an alternative embodiment, the light source 40 comprises a different number of LEDs, wherein the ratio between the number of red, green and blue LEDs is 1:12:2, for example, 3 red LEDs, 36 green LEDs and 6 blue LEDs. Table 1 shows alternative embodiments of the light source 40 in terms of the ratio of the number (#) of red (R), green (G) and blue (B) LEDs, the power usage of the red, green and blue LEDs, the luminous flux of the light source, the color coordinates x and y of the light generated by the light source as well as the color temperature $T_c$, the color-rendering index $R_a$ and the parameter $B_b$ of the light generated by the light source. The exact total number of LEDs in a light source 40 depends on the required light output and on the light output of the individual LEDs. Given the number of LEDs for each color (red, green and blue) in the light source 40, one can calculate the spectral power distribution of each individual LED and the power usage of each individual LED, the luminous flux, efficacy, color coordinates x and y, the color temperature $T_c$, the general color-rendering index $R_a$ and the parameter $B_b$. When designing the light source 40, a maximum value of the parameter B and a minimum value of the general color-rendering index $R_a$ which the light generated by the light source 40 may have are chosen. In addition, a minimum value of the power usage is chosen in order to balance the cost of the light source 40 relative to its light output. This minimum value of the power usage is preferably 60%. Given the spectral power distribution for each individual LED, the required number of red, blue and green LEDs is determined via an iterative procedure. FIG. 5A shows the resulting spectral power distribution, i.e. the output power OP in W nm$^{-1}$ versus the wavelength $\lambda$ in nm of the generated light, of the light source 40 having a ratio of 1:36:18 in the number of red, green and blue LEDs, as shown in Table 1. The light source 40 emits light with a specific luminous flux of 1068 lm. The parameter $B_b$, the ratio of the integral spectral power distribution over a first range of 575 nm$\leq\lambda\leq$650 nm to that of a second range of 380 nm$\leq\lambda\leq$780 nm, is 0.05. The general color-rendering index $R_a$ is 38. In general, when using red, green and blue Luxeon I LEDs, the ratio between the integral spectral power distribution of the red LEDs and the total integral spectral power distribution of all LEDs is between 1:47 and 1:1500 in order to generate light with a general color-rendering index $R_a\geq 20$ and a parameter $B_b\leq 0.15$.

TABLE 1

Embodiments of a light source comprising red, green and blue Luxeon I LEDs

| ratio of # of LEDs | | | power usage [—] | | | flux | efficacy | x | y | $T_c$ | $R_a$ | B |
|---|---|---|---|---|---|---|---|---|---|---|---|---|
| R | G | B | R | G | B | [lm] | [lm W$^{-1}$] | [—] | [—] | [K] | [—] | [—] |
| 1 | 40 | 12 | 0.6 | 1 | 1 | 1093 | 21 | 0.1913 | 0.3709 | 14000 | 29 | 0.0382 |
| 1 | 87 | 12 | 1 | 1 | 1 | 2221 | 22 | 0.2158 | 0.4907 | 8500 | 20 | 0.0415 |
| 1 | 36 | 18 | 1 | 1 | 0.98 | 1068 | 20 | 0.1810 | 0.2976 | 25000 | 38 | 0.0500 |
| 1 | 16 | 3 | 0.6 | 1 | 1 | 429 | 22 | 0.2270 | 0.4385 | 9000 | 38 | 0.1010 |
| 1 | 12 | 2 | 0.6 | 1 | 0.64 | 316 | 23 | 0.2600 | 0.5086 | 7250 | 40 | 0.1500 |
| 1 | 17 | 3 | 0.9 | 1 | 0.72 | 453 | 23 | 0.2555 | 0.4865 | 7500 | 43 | 0.1500 |

In an alternative embodiment, the light source 40 contains blue and green LEDs. Table 2 shows embodiments of the light source 40 in terms of the ratio of the number (#) of green (G) and blue (B) LEDs, the power usage of the green and blue LEDs, the luminous flux of the light source, the color coordinates x and y of the light generated by the light source as well as the color temperature $T_c$, the color-rendering index $R_a$ and the parameter $B_b$ of the light generated by the light source.

TABLE 2

Embodiments of a light source comprising green and blue LEDs

| ratio of # of LEDs | | Power usage | | flux | efficacy | x | y | $T_c$ | $R_a$ | B |
|---|---|---|---|---|---|---|---|---|---|---|
| G | B | G | B | [lm] | [lm W$^{-1}$] | [—] | [—] | [K] | [—] | [—] |
| 3 | 1 | 1 | 1 | 82 | 20 | 0.1772 | 0.3557 | 17000 | 21 | 0.0048 |
| 3 | 1 | 1 | 0.95 | 81 | 21 | 0.1787 | 0.3634 | 17000 | 21 | 0.0049 |

Figure 5B:
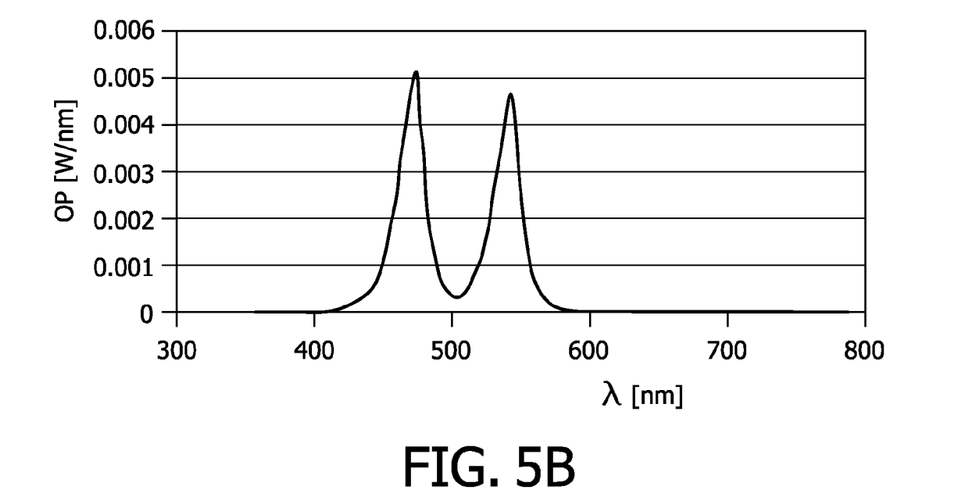
FIG. 5B shows a spectral power distribution of an alternative third embodiment of a light source according to the invention.

FIG. 5B shows the resulting spectral power distribution, i.e. the output power OP in W nm$^{-1}$ versus the wavelength $\lambda$ in nm of the generated light, of the light source 40 having a ratio of 3:1 in the number of green and blue LEDs, as shown in Table 2. The light source 40 emits light with a specific luminous flux of 81 lm/W. The parameter $B_b$, the ratio of the integral spectral power distribution over a first range of 575 nm$\leq\lambda\leq$650 nm to that of a second range of 380 nm$\leq\lambda\leq$780 nm, is 0.05. The general color-rendering index $R_a$ is 21. In general, when using green and blue Luxeon I LEDs, the ratio between the integral spectral power distribution of the blue LEDs and the integral spectral power distribution of the green LEDs is between 1:3 and 2:3 in order to generate light with a general color-rendering index $R_a\geq 20$ and a parameter $B_b\leq 0.15$.

Figure 6:
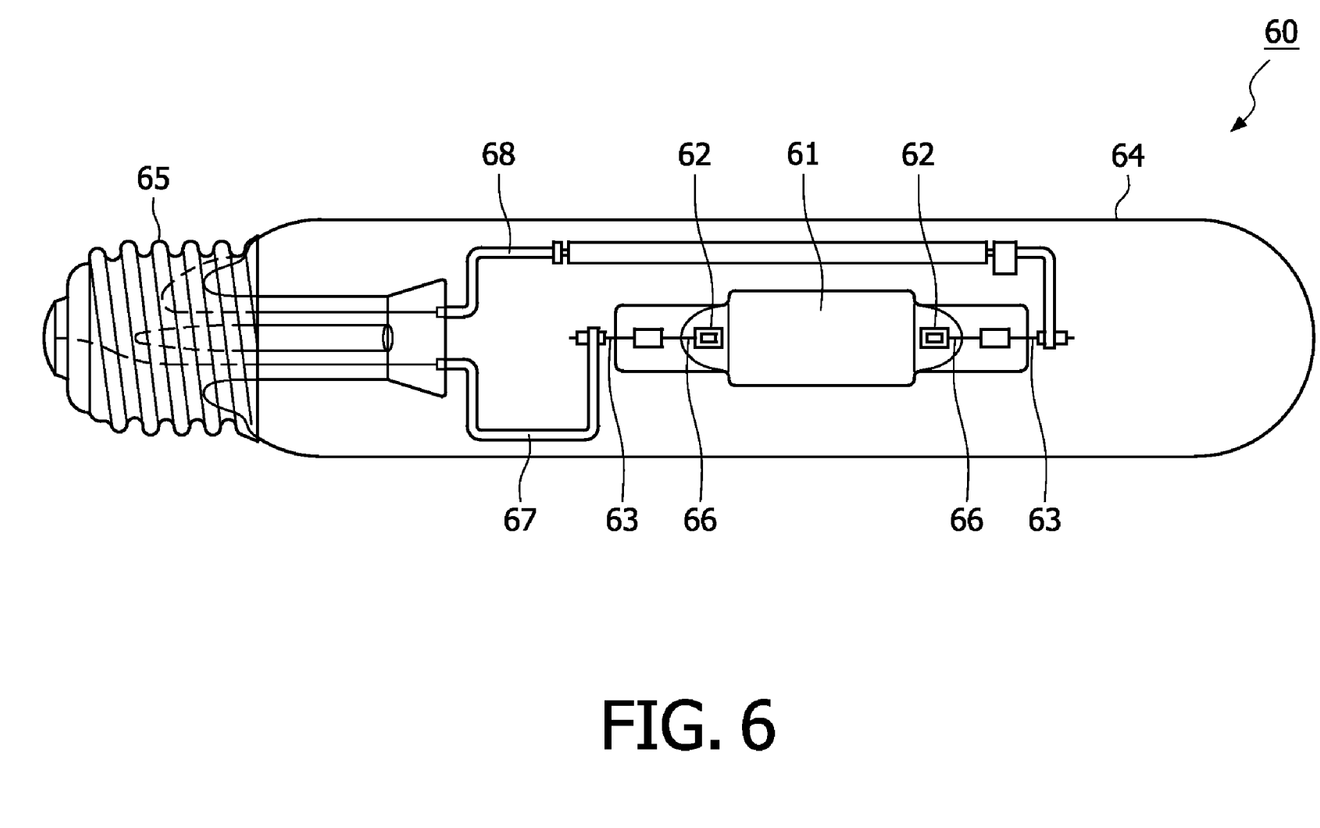
FIG. 6 is a cross-sectional view of a fourth embodiment of a light source according to the invention.
Figure 7:
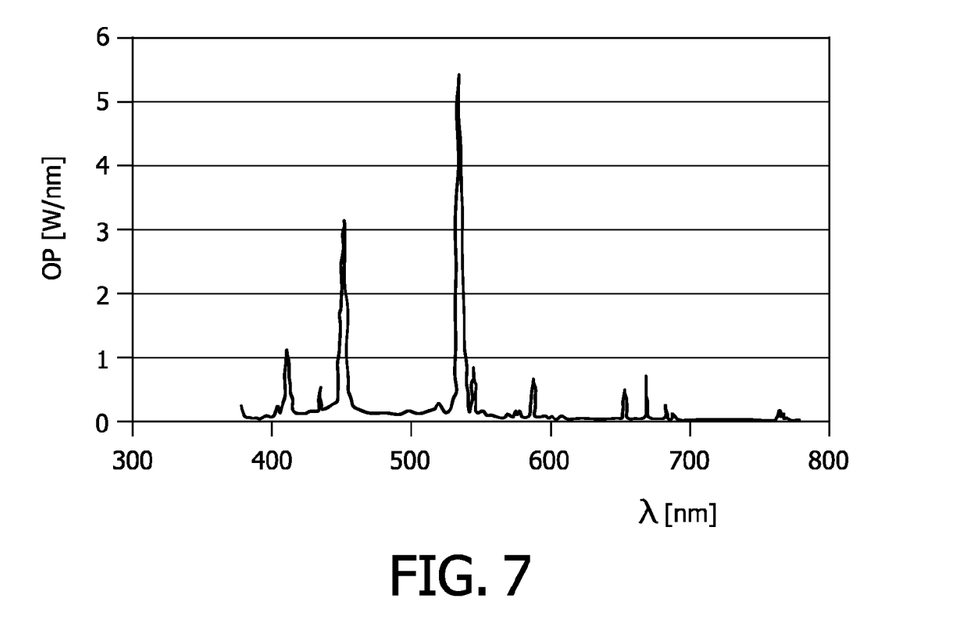
FIG. 7 shows a spectral power distribution of the fourth embodiment of a light source according to the invention.

FIG. 6 schematically shows a fourth embodiment of a light source 60 according to the invention. The light source 60 is a high-pressure metal halide discharge lamp having a gastight, light-transmissive discharge vessel 61 of quartz glass. The discharge vessel has an ionizable filling of rare gas and metal halide. In this embodiment, the filling comprises a mixture of thallium iodide, indium iodide, mercury and a rare gas consisting of a mixture of 85% by volume of krypton and 15% by volume of argon with a filling pressure of 100 mbar. In a preferred embodiment, the ratio of the amount by weight of thallium iodide to that of indium iodide is 1.5 and the ratio of the amount by weight of mercury to that of both thallium iodide and indium iodide is 10. Each electrode 62 in the discharge vessel has a rod 66 substantially comprising tungsten, which rods are connected to molybdenum conductors 63 which lead out through the discharge vessel to the exterior and are connected to a lamp base 65 via electric contacts 67 and 68. The lamp has a hard glass outer bulb 64 carrying the lamp base 65. The lamp shown has a power consumption of 400 W. FIG. 7 shows the resulting spectral power distribution, i.e. the output power OP in W nm$^{-1}$ versus the wavelength $\lambda$ in nm of the generated light, of the high-pressure metal-halide lamp 60. The lamp emits light with a specific luminous flux of 72 lm/W. The parameter $B_b$, the ratio of the integral spectral power distribution over a first range of 575 nm$\leq\lambda\leq$650 nm to that of a second range of 380 nm$\leq\lambda\leq$780 nm, is 0.1. The general color-rendering index $R_a$ is 48.

Figure 8:
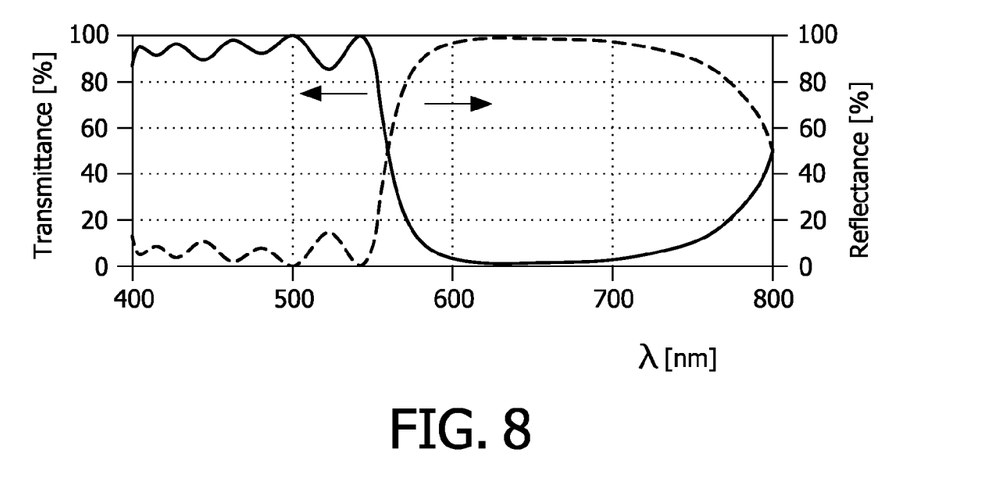
FIG. 8 shows a reflection spectrum of an interference filter comprising alternating layers of $TiO_2$ and $SiO_2$.

In a further alternative embodiment, the light source according to the invention comprises a high-pressure metal halide discharge lamp provided with an interference filter which at least partly blocks light with a wavelength $\lambda$ in the range of 575 nm$\leq\lambda\leq$650 nm. The high-pressure metal halide discharge lamp is of the type as shown in FIG. 6, but its light-transmissive discharge vessel 61 is made of a ceramic material. In this embodiment, the filling comprises a mixture of sodium iodide, thallium iodide, holmium iodide, dysprosium iodide, thallium iodide, mercury and a rare gas. For example, the metal halide lamp is a Philips 70 W CDM-T 830™ lamp. The surface of the hard glass outer bulb 64 facing the light-transmissive discharge vessel 61 is provided with an interference filter of alternating layers consisting of TiO$_2$ and SiO$_2$, starting with a layer of TiO$_2$ on the glass surface of the outer bulb 64. There are a total number of 12 layers of TiO$_2$ and SiO$_2$. The composition of the filter is shown in Table 3, and the reflection spectrum of the filter is shown in FIG. 8. The filter has a relatively high reflectance (low transmission) for light with a wavelength $\lambda$ in the range of 575 nm$\leq\lambda\leq$650 nm. The combination of the filter with a Philips 70 W CDM-T 830 metal halide lamp results in the generation of light with a general color-rendering index $R_a$ of 33 and a parameter $B_b$ of 0.05.

TABLE 3

Composition of the interference filter

| Layer | Material | Refractive Index [—] | Physical Thickness (nm) |
|---|---|---|---|
| | | Air | |
| 1 | SiO$_2$ | 1.45531 | 127.66 |
| 2 | TiO$_2$ | 2.26161 | 88.02 |
| 3 | SiO$_2$ | 1.45531 | 117.87 |
| 4 | TiO$_2$ | 2.26161 | 71.86 |
| 5 | SiO$_2$ | 1.45531 | 116.59 |
| 6 | TiO$_2$ | 2.26161 | 65.59 |
| 7 | SiO$_2$ | 1.45531 | 125.93 |
| 8 | TiO$_2$ | 2.26161 | 62.92 |
| 9 | SiO$_2$ | 1.45531 | 121 |
| 10 | TiO$_2$ | 2.26161 | 69.14 |
| 11 | SiO$_2$ | 1.45531 | 116.36 |
| 12 | TiO$_2$ | 2.26161 | 79.17 |

Substrate: quartz glass

The composition of an alternative interference filter is shown in Table 4.

TABLE 4

Composition of an alternative interference filter

| Layer | Material | Refractive Index [—] | Physical Thickness (nm) |
|---|---|---|---|
| | | Air | |
| 1 | TiO$_2$ | 2.26161 | 5.26 |
| 2 | SiO$_2$ | 1.45531 | 40.09 |
| 3 | TiO$_2$ | 2.26161 | 92.57 |
| 4 | SiO$_2$ | 1.45531 | 21.05 |
| 5 | TiO$_2$ | 2.26161 | 121.19 |
| 6 | SiO$_2$ | 1.45531 | 18.22 |
| 7 | TiO$_2$ | 2.26161 | 124.97 |
| 8 | SiO$_2$ | 1.45531 | 10.22 |
| 9 | TiO$_2$ | 2.26161 | 207.82 |
| 10 | SiO$_2$ | 1.45531 | 11.29 |
| 11 | TiO$_2$ | 2.26161 | 102.9 |
| 12 | SiO$_2$ | 1.45531 | 132.74 |
| 13 | TiO$_2$ | 2.26161 | 79.75 |
| 14 | SiO$_2$ | 1.45531 | 113.79 |
| 15 | TiO$_2$ | 2.26161 | 8.54 |
| 16 | SiO$_2$ | 1.45531 | 41.28 |
| 17 | TiO$_2$ | 2.26161 | 28.44 |
| 18 | SiO$_2$ | 1.45531 | 23.42 |
| 19 | TiO$_2$ | 2.26161 | 88.95 |
| 20 | SiO$_2$ | 1.45531 | 132.04 |
| 21 | TiO$_2$ | 2.26161 | 68.38 |
| 22 | SiO$_2$ | 1.45531 | 120.46 |
| 23 | TiO$_2$ | 2.26161 | 72.42 |
| 24 | SiO$_2$ | 1.45531 | 113.48 |
| 25 | TiO$_2$ | 2.26161 | 76.07 |
| 26 | SiO$_2$ | 1.45531 | 117.22 |
| 27 | TiO$_2$ | 2.26161 | 83.72 |

Substrate: quartz glass

Figure 9:
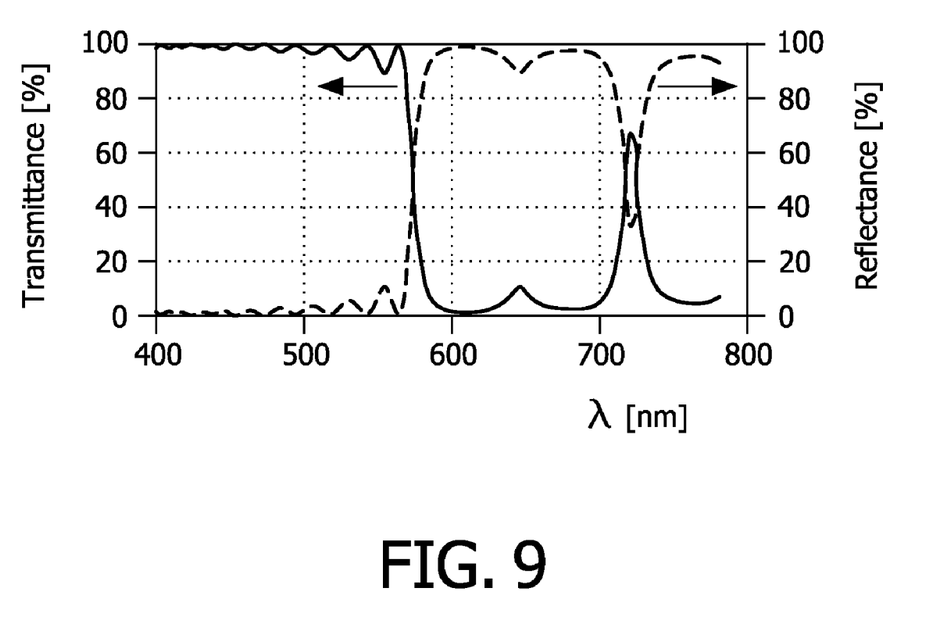
FIG. 9 shows a reflection spectrum of an alternative interference filter comprising alternating layers of $TiO_2$ and $SiO_2$.

The alternative interference filter comprises alternating layers consisting of TiO$_2$ and SiO$_2$, starting with a layer of TiO$_2$ on the glass surface of the outer bulb 64. There are a total number of 27 layers of TiO$_2$ and SiO$_2$. The reflection spectrum of the alternative interference filter is shown in FIG. 9. The filter has a relatively high reflectance (low transmission) for light with a wavelength $\lambda$ in the range of 575 nm$\leq\lambda\leq$650 nm. The combination of the alternative interference filter with a Philips 70 W CDM-T 830 metal halide lamp results in the generation of light with a general color-rendering index $R_a$ of 30 and a parameter $B_b$ of 0.04.

In an alternative embodiment, the interference filter is positioned at the surface of the hard glass outer bulb 64 facing away from the light-transmissive discharge vessel 61. In a further alternative embodiment, the light source is a low-pressure mercury gas discharge lamp provided with an interference filter. In another alternative embodiment, the interference filter is arranged at a position remote from the light source, for example, on the front glass of a luminary or in between the light source and the front glass of a luminary. By proper selection of the light spectrum generated by the light source and the amount of light reflected by the filter, light with a parameter $B_b\leq0.15$ and a general color-rendering index $R_a\geq20$ is generated.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim.

The article "a" or "an" preceding an element does not exclude the presence of a plurality of such elements. The invention may be implemented by means of hardware comprising several distinct elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A light source for generating light having a spectral emittance in at least a part of the range of 380 nm to 780 nm, the light having a spectral power distribution $E(\lambda)$ as a function of the wavelength $\lambda$, and a general color-rendering index $R_a$, wherein the ratio of the integral spectral power distribution over a first range of 575 nm$\leq\lambda\leq$650 nm to that of a second range of 380 nm$\leq\lambda\leq$780 nm is given by the relation:

$$\frac{\int_{575}^{650} E(\lambda)d\lambda}{\int_{380}^{780} E(\lambda)d\lambda} = B_b,$$

and wherein $0<B_b\leq 0.15$ and $R_a\geq 20$.

2. A light source according to claim 1, wherein $B_b\leq 0.10$.

3. A light source according to claim 1, wherein the light source is a low-pressure mercury vapor discharge lamp comprising a discharge vessel, the discharge vessel enclosing, in a gastight manner, a discharge space provided with an inert gas and mercury and comprising discharge means for maintaining a discharge in the discharge space, at least a part of a wall of the discharge vessel being provided with a luminescent layer comprising a mixture of $BaMg_2Al_{16}O_{27}$:Eu, Mn and $BaMgAl_{10}O_{17}$:Eu.

4. A light source according to claim 3, wherein the ratio of the amount by weight of $BaMg_2Al_{16}O_{27}$:Eu, Mn divided by the amount by weight of $BaMgAl_{10}O_{17}$:Eu is in the range of 1.5 to 13, preferably in the range of 1.5 to 2.

5. A light source according to claim 4, wherein the ratio of the amount by weight of $BaMg_2Al_{16}O_{27}$:Eu, Mn divided by the amount by weight of $BaMgAl_{10}O_{17}$:Eu is in the range of 1.8 to 1.9.

6. A light source according to claim 1, wherein the light source comprises a plurality of green LEDs and blue LEDs.

7. A light source according to claim 6, wherein the light source further comprises at least one red LED.

8. A light source according to claim 1, wherein the light source is a high-pressure metal halide discharge lamp comprising a discharge vessel, the discharge vessel enclosing, in a gastight manner, a discharge space provided with an inert gas, mercury and a metal halide and comprising discharge means for maintaining a discharge in the discharge space.

9. A light source according to claim 8, wherein the metal halide comprises a mixture of thallium iodide and indium iodide, in which the ratio of the amount by weight of thallium iodide to the amount by weight of indium iodide is about 1.5.

10. A light source according to claim 9, wherein the discharge space further comprises mercury, the ratio of the amount by weight of mercury to the combined amount by weight of thallium iodide and indium iodide being about 10.

11. A light source according to claim 1, characterized in that the light source further comprises an interference filter which at least partly reflects or absorbs light with a wavelength $\lambda$ in the range of 575 nm$\leq\lambda\leq$650 nm so as to prevent, at least partly, the light in said range from reaching the surroundings of the light source.

12. A light source according to claim 11, comprising a high-pressure metal halide lamp having a discharge vessel, the discharge vessel enclosing, in a gastight manner, a discharge space provided with an inert gas, mercury and a metal halide and comprising discharge means for maintaining a discharge in the discharge space, and an interference filter of alternating layers of $SiO_2$ and $TiO_2$ provided on at least a part of the discharge vessel.

13. A method for operating a lighting system, the lighting system comprising at least one light source according to claim 1 and at least one additional lighting element being separately controllable from the light source, said at least one additional lighting element being capable of emitting radiation in the wavelength range of 575 nm$\leq\lambda\leq$780 nm in such an amount that the parameter $B_b$ of the lighting system during operation of at least the at least one additional lighting element is $B_b>0.15$, the method comprising the steps of:

selecting an operating state of the lighting system from the group consisting of off-state, daylight-state and moonlight-state;

operating the lighting system in the selected operating state.

* * * * *